United States Patent [19]
Beesley et al.

[11] Patent Number: 5,907,320
[45] Date of Patent: May 25, 1999

[54] TIME-BASED METHOD OF HUMAN-COMPUTER INTERACTION FOR CONTROLLING STORAGE AND RETRIEVAL OF MULTIMEDIA INFORMATION

[76] Inventors: John Beesley, 16911 Brushfield Dr., Dallas, Tex. 75248; James E. Callan, III, 17091 Knots Landing, Dallas, Tex. 75248

[21] Appl. No.: 08/729,539

[22] Filed: Oct. 11, 1996

Related U.S. Application Data

[63] Continuation of application No. 08/192,605, Feb. 7, 1994, abandoned.

[51] Int. Cl.[6] ........................................ G06F 3/05
[52] U.S. Cl. .......................... 345/302; 345/327; 707/501; 707/513
[58] Field of Search ...................... 395/762, 773, 395/806, 807, 173, 327, 329, 334, 338; 345/157, 302, 473, 327, 329, 334, 338; 348/13; 379/74, 77; 707/501, 512, 513

[56] References Cited

U.S. PATENT DOCUMENTS

| | | | |
|---|---|---|---|
| 4,797,913 | 1/1989 | Kaplan et al. | 379/91 |
| 4,899,369 | 2/1990 | Kondziela | 379/101 |
| 4,943,995 | 7/1990 | Daudelin et al. | 379/67 |
| 5,281,962 | 1/1994 | Vanden Heuvel et al. | 340/825.44 |
| 5,485,370 | 1/1996 | Moss et al. | 364/408 |
| 5,539,871 | 7/1996 | Gibson | 395/762 |

OTHER PUBLICATIONS

Paradox 3.5, "*Introduction to Paradox Version 3.5,*" Boreland International, pp. 2,4,5,16,34–35, 45,77–80, 110–113 (1990).
Paradox 3.5, "*User's Guide Version 3.5,*" Boreland International, pp. 10, 14,57,46–49 (1990).
Paradox 3.5, "*Presenting Paradox Data Version 3.5,*" Boreland International, pp. 5–9, 11 (1990).
Rosenberg, "*Dictionary of Computers, Information Processing & Telecommunications, Second Edition,*" John Wiley & Sons, pp. 28,527 (1987).
Katzan, Jr. "*Distributed Information Systems,*" Petrocelli Books, Inc., pp. 194–195 (1979).
Ullman, "*Principles of Database Systems, Second Edition,*" Computer Science Press (1982).
"Microsoft Press Computer Dictionary, Second Edition", Microsoft Press, p. 264, (1994).

*Primary Examiner*—Joseph H. Feild
*Assistant Examiner*—Stephen Hong

[57] ABSTRACT

This invention provides a new, time-based method for controlling the storage and retrieval of multi-media information by the successive selection of the values of their attributes. In accordance with the invention, a user may contact a remote multi-media information storage medium via a communications medium and, using special signals, control the sequence of attribute selection messages that are transmitted. One, several, or all of the values of a particular attribute can be selected, which in turn, determine the related values of the attributes to be subsequently transmitted. In this manner, the progressive selection of attribute values narrows down the number of items of multi-media information available for retrieval, or in the case of storage, the appropriate final storage location. The user may order the transmission of the attributes to optimize the search process. The concepts of attribute-value completeness and accuracy can be employed to enable a best-fit search to be made of the stored multi-media information. In a further refinement, when no item information match occurs, the user may request the system store the series of attribute values of his inquiry. The system can then make periodic searches of the database. The user is contacted when a match occurs. A method for alphanumeric input using a multi-key sequence on a generic key pad is also disclosed.

7 Claims, 4 Drawing Sheets

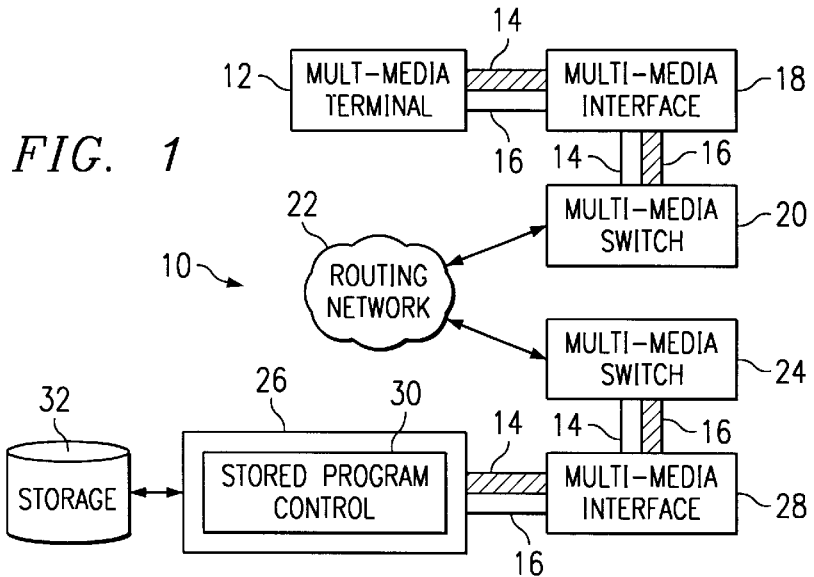
FIG. 1
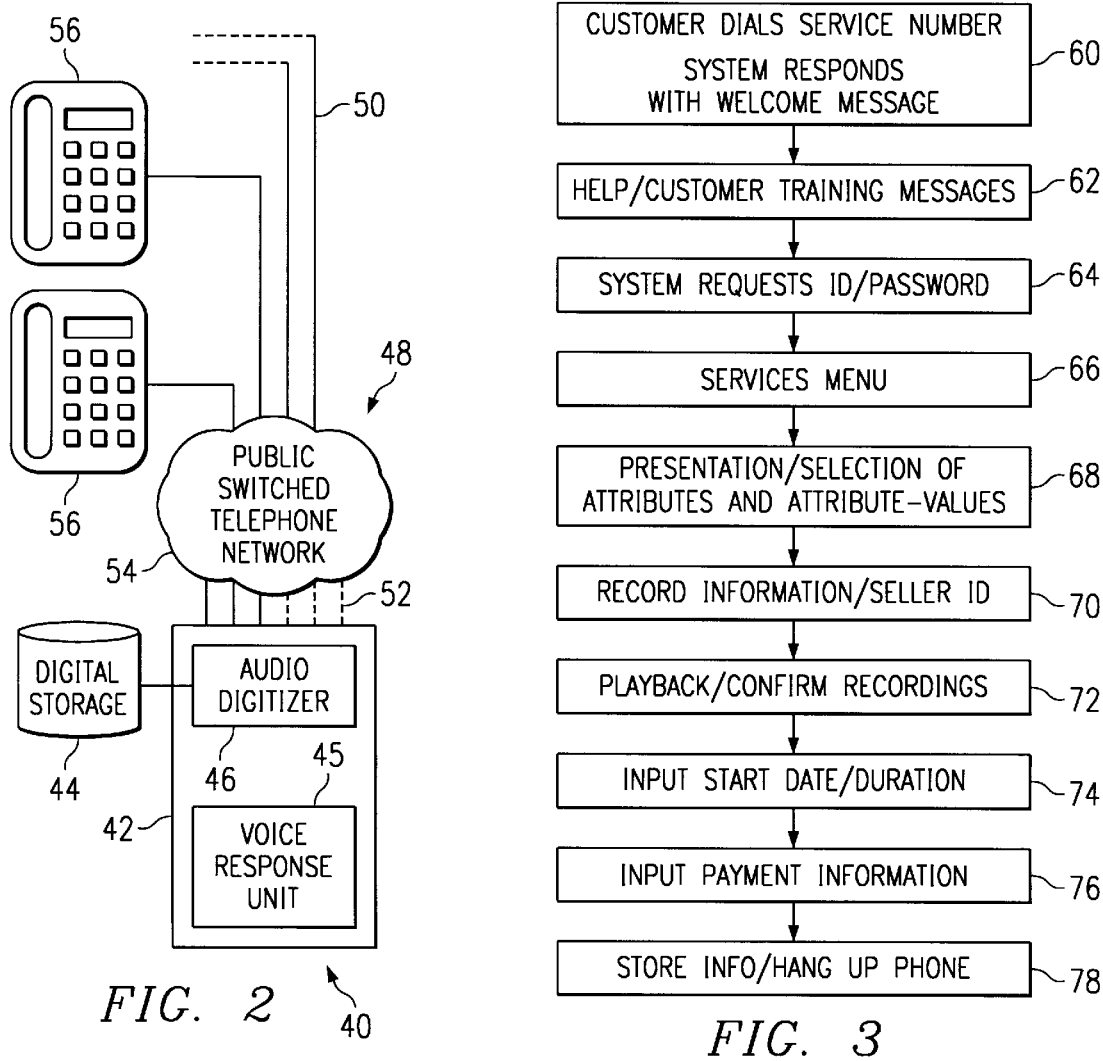
FIG. 2
FIG. 3

CONTROL SIGNALS

| KEY PRESSED | ACTION |
| --- | --- |
| "0" PRESSED DURING: | |
|     ATTRIBUTE PROMPT | SELECTS ALL ATTRIBUTE-VALUES |
|     PLAYING ATTRIBUTE-VALUE | SELECT THAT ATTRIBUTE-VALUE |
| "*" PRESSED DURING: | |
|     ATTRIBUTE PROMPT | RETURN TO PREVIOUS ATTRIBUTE PROMPT |
|     PLAYING ATTRIBUTE-VALUE | RETURN TO PREVIOUS ATTRIBUTE-VALUE |
| "#" PRESSED DURING: | |
|     ATTRIBUTE PROMPT | GO TO NEXT ATTRIBUTE PROMPT |
|     PLAYING ATTRIBUTE-VALUE | GO TO NEXT ATTRIBUTE-VALUE |

ALPHANUMERIC DATA ENTRY

| KEYS PRESSED | DATA ENTERED | KEYS PRESSED | DATA ENTERED |
| --- | --- | --- | --- |
| 21 | A | 91 | W |
| 22 | B | 92 | X |
| 23 | C | 93 | Y |
| 31 | D | 77 | Q |
| 32 | E | 99 | Z |
| 33 | F | *0 | 0 |
| 41 | G | *1 | 1 |
| 42 | H | *2 | 2 |
| 43 | I | *3 | 3 |
| 51 | J | *4 | 4 |
| 52 | K | *5 | 5 |
| 53 | L | *6 | 6 |
| 61 | M | *7 | 7 |
| 62 | N | *8 | 8 |
| 63 | O | *9 | 9 |
| 71 | P | 11 | SPACE |
| 72 | R | 12 | , |
| 73 | S | 13 | . |
| 81 | T | 14 | ; |
| 82 | U | 15 | : |
| 83 | V | | |

FIG. 4

TIME-BASED METHOD OF HUMAN-COMPUTER INTERACTION FOR CONTROLLING STORAGE AND RETRIEVAL OF MULTIMEDIA INFORMATION

This application is a continuation of application Ser. No. 08/192,605, filed Feb. 7, 1994, now abandoned.

FIELD OF THE INVENTION

The present invention relates to a method of storing and retrieving a multiplicity of multi-media information by categorizing them by their particular attribute-values which are used to discriminate between the information being stored or retrieved.

BACKGROUND OF THE INVENTION

Modern telecommunications make it possible for individuals to receive, in multi-media form, information that has been stored at a remote location. Conversely, information may also be transmitted to a remote storage medium for later retrieval by other parties. Typically, the information must be stored in the form of a series of messages that are categorized in some manner to aid in the process of selecting or storing a particular piece of information.

Multi-media information is defined as one or more of the following forms of information: images, ASCII or EBCDIC text, binary numeric data, audio text, video, and encoded control signals for sensory stimulations derived from sensory actions.

The concept of the invention may be understood by considering the storage and retrieval of audio messages via the telephone. In this case, the telephone is used as an input/output device to store/retrieve audio information in digital form on a computer. Such systems have been given the generic name audiotext services.

Various methods have been devised to enable the user a) to store a message in the proper place, and b) to quickly select a particular message from all those that are available. Thus, some form of search mechanism must be implemented, usually at the computer information store or storage medium, that will perform the storage and/or retrieval in a fast, fail-safe manner.

In the case of audiotext, the most common method of implementing such a mechanism is to present the caller with an audio menu, which, for example, prompts the caller as follows: "If you wish to hear your account balance, press 4" and "Please enter your social security number now". When the user presses a key, or set of keys, the next level of the menu is presented. Thus, the caller can be lead through a static menu tree until the identity of a particular stored item can be determined and played back to the caller. In a similar manner, the information system can prompt the user to respond to questions so that the correct storage location for the user's data input can be determined.

There are, however, several problems with this method of human-computer interaction with audiotext information. The general problem is that the number of menu levels and the number of menu items in each level must be limited, or otherwise the user gets lost. It has been found that most people, when confronted with a numbered list from which to choose, can only remember up to five or six items. Moreover, a deep or long menu list also becomes confusing to the caller, unless extra navigational aids are provided to help the user visualize the menu structure. To date, therefore, this type of interface can only be used with relatively simple applications that require a very limited menu, such as an application that provides a customer's bank balance.

Another method of presentation and control of audiotext services has been proposed in which the problems of a static menu structure are avoided by presenting a series of short excerpts of available items. This is analogous to modern car radios, where each radio station is automatically scanned, and played briefly, so that the listener can make a selection of the station he or she wishes to hear. In the case of an audiotext service, the user can press a particular key, say the "0" key, to stop the presentation of these excerpts and hear the entire message. The method presupposes that the messages are so dissimilar as to be immediately discernible by hearing an excerpt. Pressing say the "#" key will continue the excerpt presentation, and pressing that key twice in rapid succession will speed up the scan by jumping to every, say, fifth excerpt in the linear stream available. The approach works well when there are a limited number of messages to which to listen. Clearly, it will not be acceptable when there are, say, many thousands of messages from which to choose. Skipping messages does speed up the process, but a skipped message may be the one of particular interest.

A much more general problem is that of selecting particular types of stored messages based upon the values of their attributes that are unique to the message content. Suppose, for example, that data on thousands of used automobiles is stored as audiotext messages. The attributes associated with each automobile description might include: make, model, age, mileage, price, and color. If the caller were interested in finding those automobiles that had low mileage and low price, the current audiotext selection techniques would be unacceptable. The scanning technique would require that the caller listen to almost the entire set of messages to obtain the information, and the limited menu technique would require that the caller re-enter the menu for every make, model and age before reaching the mileage and price levels. If there were only three makes, three models, and three age ranges, the caller would have to enter the menu twenty seven times to hear all the available information on low mileage, low priced automobiles.

It is the purpose of the present invention to provide human-computer interaction with an audiotext service so that data items with multiple attributes can be stored and/or retrieved in a single pass of the menu in a fast, fail-safe manner. Furthermore, the invention provides comprehensive navigational aids to the caller that are indispensable when performing transactions with an extremely large multi-attribute database. A method of entering alphanumeric information into the system in an unambiguous manner is also described. Currently, alphanumeric information can be entered by pressing a single key on the telephone keypad, which transmits a dual-tone to a remote system. However, this dual-tone may represent up to three different characters on the keypad. For example, pressing "2" on the telephone keypad may represent the character "A", "B", or "C". The system has to determine the correct character by the context of the character within the sequence of transmitted characters. The ambiguous nature of this type of encoding may not be resolvable.

The invention is further extended to all audio/video/multimedia types of information and all mechanisms of audio, visual, tactile, or other sensor interfaces and transmission media.

SUMMARY OF THE INVENTION

The present invention is a method of storing and retrieving multi-media types of information by assigning, and then making use of, the attribute-values associated with that information. This technique permits information associated with a particular attribute to be retrieved in any order, and allows precise navigational aids to be implemented.

The invention applies to any interface device that permits a user to store and retrieve multi-media information via any form of communications media. The principle of the invention can be discussed using the public telephone system as a convenient communications medium. Taking the storage of information concerning used automobiles as an example, suppose that each automobile has six attributes: make, model, age, mileage, price, and color. In the case of the caller wishing to enter information on a given automobile which he wishes to sell, the system prompts the caller with a series of questions concerning the particular attribute-values of the automobile. For example, the system might prompt "please enter the make of your automobile", and then recite the various makes (attribute-values) of automobiles in, say, a male voice. When the caller hears the specific make of his automobile, for example "Buick", he presses a key, say the "0" key. The system repeats (echoes) the make of the automobile back to the caller in a different voice, say a female as distinct from the male voice that recited the possible make (attribute-value) to the caller. This is called positive confirmation in a user interface, and is highly desirable. If the user has entered an error, he can press a second key, say the "*" key, to repeat the prompt by the system and correct the error. However, if the echo is correct the caller does nothing and the system prompts the caller for the next attribute entry, and so forth. When all six attributes have been entered, the system prompts the caller to enter a detailed message describing the automobile itself. In this manner the system stores the detailed information describing the automobile, and also the various attribute-values associated with that particular automobile.

Once item descriptions and their attribute-values have been stored using the technique described, they can be selected using a static or dynamic menu, since they are all equally accessible. This facility affords great flexibility in the manner in which the entire database can be queried by a caller wishing to purchase an automobile.

The present invention provides various dialogue techniques to the user for navigating through the system. The first type of dialogue is the static dialogue or static menu tree in which the attributes are always listed or presented in a particular or fixed order, for example: make, model, age, mileage, price, and color. Thus, the system would present the first attribute to the caller as follows: "Please select one or more of the following makes of automobile". This announcement is called the attribute-value discrimination prompt.

During the recitation of the attribute-values (for example; General Motors (GM), Ford, Chrysler, etc) the user can press a key, say the "0" key, to select a particular make. This key is always the same, unlike systems that require a user to press different numeric keys to make different selections, which may lead to confusion. The selection is echoed for confirmation, and the list of remaining attribute-values is continued. The caller selects one or more makes, as desired. Pressing a given key, say the "#" key, terminates the recital of the current attribute-values and the system proceeds directly to the next attribute (model), and so forth. If, for example, the make "Chrysler" had been chosen by the caller only those models made by Chrysler would be presented for selection. If the caller were interested in all makes, he would press the "0" key during the attribute-value discrimination prompt, and proceed directly to the next attribute.

If the caller makes an incorrect selection during the recital of the attribute-values, pressing the "*" key will erase the selection and replay the attribute-value discrimination prompt of the current attribute. If the "*" is pressed during the prompt, the caller is taken back to the preceding attribute. Thus, the caller can navigate back up the menu structure to correct any entry mistake, and also back up to the on-line "Help" dialogue, which is placed at the first level of the menu. The "Help" dialogue generally describes to the user how to use the system, e.g., what keys to press at what time to convey your decisions, etc.

To aid the navigation through the structured menu during the dialogue, the system calculates how many stored items are available after each attribute-value selection. Thus, when the first attribute prompt is played ("make" in the example given) the total number of automobiles available is also announced, 8,000 for example. Once a make (say Chrysler) is chosen, the system might announce that there are 1,200 Chryslers of various models from which to choose. If the caller next selects the "New Yorker" model, for example, the system might announce that there are 167 "New Yorkers" of various types from which to choose. In this manner, the caller can tell how far to proceed in the menu selection process so as to arrive at a reasonably small number of detailed automobile messages to hear.

The second type of dialogue is the dynamic dialogue or dynamic menu tree in which the user may choose the order in which the attributes are listed. Dynamic menus have great utility for particular classes of caller. In the example of stored automobile information, the caller may be most interested in all used automobiles that cost less than, say, $2,000. The system first prompts the caller to select his most important attribute from the list of the six attribute categories, which are then presented. In this case the caller would select "price". The caller would next be prompted to select one or more of the various price attribute-values, which in this example might be the first two: "zero to $1,000" and "$1,000 to $2,000". The system would then state that the database contains, say, 358 automobiles priced less than $2,000. The caller might select "mileage" as the next most important category. The caller might then select the lowest mileage category: "0–10,000 miles", and the system might respond with "There are zero automobiles available in this mileage range". The caller would then press the "*" key to return to the mileage attribute message, which would permit the caller to select the next mileage range, and so forth. The caller might have to search to, say, the "60,000 to 70,000 miles" range to find a number of automobiles available, say eight in this case. The caller might then wish to listen to all eight. Alternatively, if the mileage was too high for the caller, the caller could press "*" twice to go back to the price attribute and select a higher price range, which, presumably, would contain automobiles of lower mileage.

In the manner just described, the user can select and reselect the attributes and the attribute-values themselves to understand and navigate through the database. The user or caller never has to listen to the detailed messages, or excerpts, themselves.

A third type of dialogue technique is described by the term "range menuing". In this case, the system prompts the caller to enter, as before, the categories in order of preference. The attribute-values in each category are divided into, say, three ranges: low, medium, and high. Price might be divided into "$0 to $5,000", "$5,000 to $15,000", and "Above $15,000". Similarly, mileage might be divided into "0 to 20,000 miles", "20,000 to 60,000 miles", and "Above 60,000 miles". The system would transmit the three attribute-values of "low-price", "medium-price", and "high-price" for the price attribute. It would also transmit "low-mileage", "medium-mileage", and "high-mileage" for the mileage attribute. The user might select low price and low mileage; the system would respond that none are available, but could respond with "best fit" responses such as "There are eight automobiles available priced less than $2,000 with mileage less than 70,000 miles", and "There are 24 automobiles available priced less than $3,000 with mileage less than 50,000 miles". The technique of manipulating the data attributes in this manner provides a degree of artificial intelligence in audiotext searches. Again, it is the attributes of the information that are queried rather than the messages themselves.

The facility of searching a database using defined attribute-values permits very specific requests to be made, especially where there are a reasonably large number of attributes. For example, the caller might enter the following eleven automobile attribute-values: GM, Cadillac, Eldorado, 1985, maroon, 50,000 to 60,000 miles, $7,000 to $8,000, air-conditioning, power steering, cloth seats, touring suspension. In the case where the system's database does not have such a vehicle, it could store the query together with a caller's name and telephone number. Thus, the system could periodically scan the database, or evaluate every new entry, for such a vehicle and automatically contact the caller when one became available. The system would have previously prompted the caller to enter his name and the digits of his telephone number. This type of dialogue service can be termed "alert" queries.

Audiotext messages are entered into the system by the caller verbally. However, alphanumeric data can also be entered non-verbally. The numbers on the telephone keypad are used to enter numerical data. Also, alpha, punctuation, and special characters can be entered by pressing two keys for each item. For alpha characters, the first key pressed is the key on which the character occurs on the telephone keypad, for example the letter "L" occurs on key "5". The second key pressed is the order (one, two, or three) in which the letter is printed on the key. In this case, "L" is the third letter on the key, and, therefore, key "3" would be pressed. Thus, the key sequence 5-3 would enter the letter "L". The two missing letters on the keypad, "Q" and "Z", could be assigned to any non-lettered key, for example 1-1, and 1-2.

The system includes the capability of dating the database messages (if time dependent) to be available through certain periods of time by permitting the caller to select the appropriate start and end dates. Messages may then be automatically activated and deleted from the database at specific times as requested by the caller.

Messages can also be given a numerical tag, and the caller given a password, to enable the caller to later locate the message for immediate or dated deletion.

The types of dialogue that are available between the user and the information storage system are as follows:

(1) Navigational, in which a user chooses a menu direction.
(2) Selection, in which a user selects a value from a list.
(3) Data Entry, in which a user keys in a value.
(4) Confirmation, in which an error message indicates a negative outcome, and an echo message indicates a positive outcome.
(5) Presentation Display, in which information is delivered to the user, or entered data echoed back to the user.

The dialogues that occur between the caller and the system are not all classified as informational. Certain dialogues are of an administrative nature. Examples of such administrative dialogues are 1) operator requests and 2) service comments and suggestions. Administrative data and informational data can be easily segregated via separate menus, which enables the system to perform its main task as a data store but also execute administrative operations in parallel.

BRIEF DESCRIPTION OF THE DRAWINGS

FIG. 1 schematically illustrates a general configuration for providing the storage and retrieval of multi-media information in accordance with the present invention.

FIG. 2 schematically illustrates a particular configuration in accordance with the present invention for providing the storage and retrieval of audio-text information using the telephone as an input/output device and the public telephone network as an information routing and transmission system.

FIG. 3 shows a flowchart of a buy/sell application in accordance with the present invention which uses the telephone as an input/output device.

FIG. 4 shows the functional operation of each key on the control and data entry keypad as used in the present invention.

DETAILED DESCRIPTION

Figure 5:
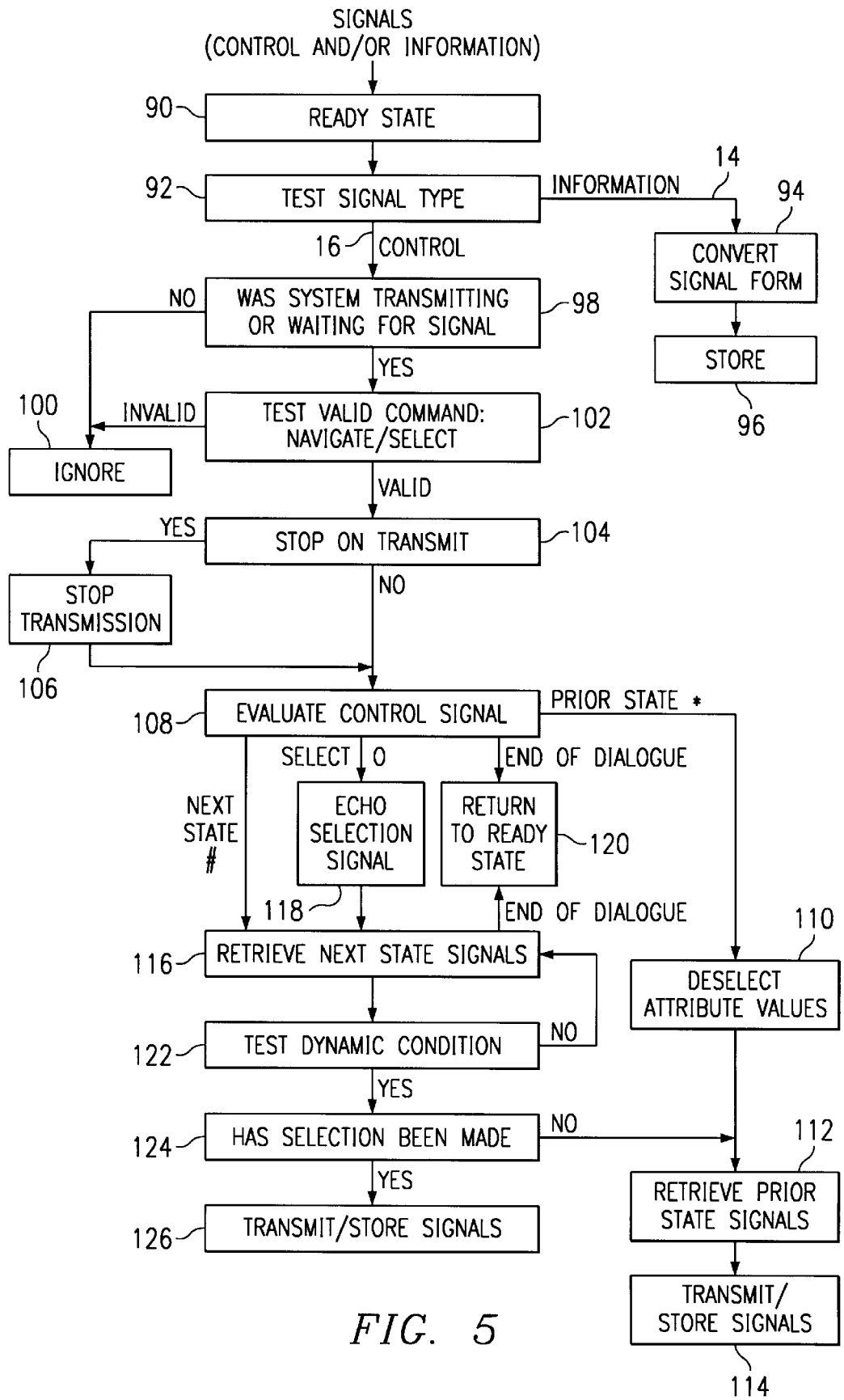
FIG. 5 shows various states of system functionality in accordance with the present invention.

Some definition of terminology is in order. The term "attribute" refers to a characteristic or characteristics of a component or end item that is pertinent to selection, incompatibility, dependency, etc. An example of an attribute applicable to automobiles might be "color". "Attribute-values" are the specific value or values or a range of values associated with the particular attribute. Values can be numeric, descriptive, yes/no, etc. An example of an attribute-value for the attribute "color" would be "red".

The specification and FIGURES provide sufficient information to enable a competent computer programmer or one of ordinary skill in the computer programming art to readily generate the specific instruction set for the interface software to an audiotext service as set forth by the present invention.

Referring to the drawing and FIG. 1 in particular, shown therein and generally designated by the reference character 10 is a generalized system for the storage and retrieval of multi-media information that is constructed in accordance with the present invention. System or information system 10 is comprised of an interactive multi-media terminal 12 (a signaling means), on which multi-media information or information signals 14 can be both presented to, and entered by, a human user. Multi-media terminal 12 receives selected information messages. In addition, control commands or control signals 16 can also be entered and received by the user. Such control and information messages are transmitted by the multi-media terminal 12. A multi-media interface 18 presents the signals 14 and 16 to a multi-media switch 20. The multi-media interface 18 may act as a temporary storage buffer, a signalling protocol converter, and a signal form converter, say from analog to digital form. The multi-media switch 20 enables the signals 14 and 16 to be connected to a routing network 22.

The routing network 22 transmits the signals 14 and 16 to another multi-media switch 24 that is located near a processor or processing device 26 that controls the storage and retrieval of multi-media information 14. The signals 14 and 16 are transferred from the routing network 22 (the signal transmission means) to the receiving processing device 26 via a local multi-media switch 24 and a multi-media interface 28. The control commands 16, entered by the user at the multi-media terminal 12, are correlated and interpreted by the stored program control 30 (the control evaluation means) of the processor 26 to selectively store and retrieve multi-media information 14 at the information storage device 32. Processor 26 transmits selected information messages.

In order for system 10 to properly store and retrieve multi-media information 14, system 10 must be able to perform certain specific operations:

1) Distinguish between information and control signals.
2) Translate terminal specific control signals into designated multi-media information selection commands or application specific navigation commands.
3) Store information for attribute-value based retrieval.
4) Retrieve messages based on attribute-values selected.
5) Encode attribute-values based on control signals received.
6) Present attribute values as a dynamic series of information transmissions.
7) Correlate a discrete control signal with an information transmission and thereby temporally associate the control signal with the event of selecting the content of the information.
8) Gradually reduce the number of pieces of information to be searched through search refinement.
9) Automatically eliminate certain attribute values based on the selection of prior attribute values.
10) Switch between attribute values and attribute prompts upon receipt of an appropriate control signal.
11) Switch between information transmissions based upon dynamic conditions such as: time, the value of a counter, content of a related message, receipt of a particular control signal, stored program control choice, the database, the interface device, or the terminal.
12) Conversion of control signals into alphanumeric sequences and alphanumeric sequences into information transmissions.
13) Conversion of information transmissions into control signals or alphanumeric sequences.
14) Echo an affirmative message on correct selection, and error/deny information on incorrect selection, which the multi-media terminal receives and presents to an interpreting human user.
15) Select one, several, or all attribute values within a set of attribute-values.
16) Combine stored information based upon dependencies or relationships for grouped or combined transmission.
17) Define relationships between separate pieces of stored information via control signals.
18) Identify and address specific multi-media terminals across the routing network.
19) Identify specific users of multi-media terminals across the routing network.

The stored program control 30 contained within the processor 26, FIG. 1, provides the system with the functions required to process the storage and retrieval of multiplicity of information forms.

The terminal device used with the present invention must be compatible with the type and nature of the information and control signals stored in the processor. In the case of the telephone system, the terminal is the telephone handset, and its keys can be used to input both control and alphanumeric data. Audio information is input and output via the microphone and speaker respectively. A video terminal/TV set can be used to communicate both audio and video information. Control signals can be input using a digital control device, such as an infra-red TV remote control, or by using a pointing device to select video or audio messages as they are received at the terminal. Similarly, devices that use other human senses, such as the tactile control of virtual reality systems, can also communicate with the processor to receive and transmit information via motion and position control signals.

A particular implementation of the invention is the storage and retrieval of audiotext information, as illustrated in FIG. 2. System or information system 40 comprises a processor 42, which is some form of digital computer that contains a stored software program of instructions. A Compaq 386 is an example of a suitable digital computer. The audiotext information is stored in a digital storage device 44 such as a hard drive.

The processor 42 also includes a voice response unit 45 and one, or more, audio digitizing circuit boards 46, which converts the analog form of the incoming audio transmission into digital form. Audio digitizing circuit boards 46 are offered by several manufacturers (Dialogic D/xxB board, for example) and are fitted into the one of the expansion slots of the processor 42. The digitizing board 46 receives analog signals via an input media and routing mechanism 48, which is shown illustratively to be local telephone lines 50, 52 and the public switched telephone network 54. The digitized information can be stored on and retrieved from a digital storage device 44 such as a hard disk. The access and manipulation of the digital information stored on the digital storage device 44 is controlled by a special application program that was developed by the inventors of the present invention. The digital information is stored in the form of a number of discrete files which can be readily stored or retrieved by the Operating System of the processor 42. An Operating System, such as MS-DOS from Microsoft Corporation, controls the basic functionality of processor 42, such as the management of files on the storage medium.

The source of the analog information, shown here to be a telephone handset 56, is able to receive and transmit information via the input media and routing mechanism 48. The operator can select particular pieces of information, stored as files on the digital storage device 44, by pressing particular keys on the telephone handset 56. More modern transmission and routing systems, such as the ISDN telephone networks, employ an entirely digital form for transmission. In the latter case, the digitizing board 46 is contained within the telephone handset 56 and control and information signals are separated at the source of transmission (telephone handset 56).

The user gains access to a given selection of stored information by first dialing a particular telephone number using the telephone handset 56, which generates and transmits Dual-Tone, Multiple Frequency (DTMF) signals along the local telephone lines 50. DTMF is now the most common form of telephonic control signal transmission, but some households in the USA still have a form of pulse signalling generated by rotary handsets. The public switched network 54, directed by the dialed number, connects the user to the digitizer board 46 in the processor 42. The application program recognizes the input signal and typically responds with a greeting message that has been stored as a digital file on the digital storage device 44. The digitizing board 46 converts the welcome message from its digitized form into an analog form for transmission to the user. This analog message is routed back to the user via the call path that was established by the public switched network system 54. In this manner, the telephone handset 56 is employed as an interactive device that enables the user to engage in a dialogue with the processor 42.

A flow diagram of a buy/sell application using a telephone network is shown in FIG. 3. The user may be connected to the system or information system 40 via the public switched telephone network 54 by dialing the telephone number of the service in step 60. The help dialogue in step 62 instructs a caller who is unfamiliar with the device in the use of the system. The training program in step 62 takes the user through the sequence of keys to press on the keypad of the telephone handset 56 to navigate through the access path to a particular file or related set of files stored by system 40. The service may request in step 64 a personal identification number and a password to gain initial access to system 40. The service menu in step 66 provides the customer with several choices: buy, sell, leave message, obtain live operator, delete sell information, and so forth. The user presses the "0" key during, say, the "sell" announcement in step 66, to enter an item for sale. The attribute information prompt and the corresponding attribute-values are presented to the user in step 68. The user selects the appropriate attribute value, and is then presented with the next attribute information prompt, and so on. Once all of the attribute-values have been entered, system 40 prompts the user in step 70 for a verbal description of the item for sale, and then the user enters his name and contact phone number. In step 72, system 40 plays the recorded information back to the user for correctness and the user can correct any entry if a mistake has been made. System 40 then prompts the user in step 74 to enter a start date and duration for the availability of the sales item for distribution to potential buyers. System 40 next prompts the user in step 76 to enter information on method of payment, say a credit card number and expiration date. Finally, system 40 files the information in step 78 in the attribute referenced index and hangs up the phone.

Box 80 in FIG. 4. summarizes the control functions that the user can perform by pressing keys on the keypad of the telephone handset. The main operational keys are the *, #, and "0" keys. The "0" key indicates that a given attribute description is the one the user wants, i.e. it is a selection indication. The "*" key indicates that the user has made an incorrect selection, or wishes to return to a prior selection category. The "#" key indicates that the user does not wish to make any more selections within a particular category and wishes to move on to the next one. Although, the keys *, #, and 0 have been designated for the control functions shown in FIG. 4, any set of convenient three keys may be so designated and used. The three keys must be chosen such that the user can easily press any one of them without looking.

Voice recognition cards can also be used to interpret audio commands as control signals. In this case the voice commands "back", "skip", and "select", would replace pressing the keys "*", "#", and "0" respectively.

The system may also request the user to enter alphanumeric data by means of the keypad. Data entry can be accomplished unambiguously by using a two key sequence for each alphanumeric character that is to be entered, as shown in box 82 of FIG. 4. The alpha characters can be entered by using their relative positions on the keypad. For example the "A" is the first character printed on the second key, and "B" is the second character on the same key, C the third, and so forth. Thus, "A" is entered as 2-1, B as 2-2, C as 2-3, and so forth. The "Q", which is not printed on the keypad could be entered as 7-7, and the Z as 9-9. A space between characters is entered as 1-1. The end of a character string can be denoted by a "#". The numerical values 0 though 9 can be entered by the two character sequence *0 through *9. The sequence "*#" will erase a character entry, the sequence "**" will return the user to the beginning point for entering alphanumeric data, and "##" indicates the end of the data entry session.

Again, although specific two-character sequences have been shown for particular alphanumeric entry, any appropriate multi-character sequence may be designated and used for English or any other language.

FIG. 5 shows various states of the functionality provided by the logic of the stored program control 30 of FIG. 1 and is not a flow diagram of signals. System 10 has the capability to both accept and transmit multi-media information 14, and also to receive and transmit the control signals 16 required to manipulate the multi-media information 14. There must, therefore, be a close compatibility in the manner that the processor 26, and multi-media terminal 12, deal with the signals being transmitted. Control signals 16 cause the processor 26 to move from one state to the next. For example, a control signal might cause the processor 26 to change from a signal transmitting state to a signal receiving state; or from transmitting the first information signal to the second information signal, and so forth. To begin a dialogue with a user, the processor 26 must be in an initialized, ready state, (box 90) in which it is capable of reacting to incoming signals.

When someone calls into the system, there are two types of signals which are received. The first type is information signals 14 in the form of voice information such as a description of an automobile that the caller would like to store in the system for later use. The second type is control signals 16 such as "stop" or "I want to select this choice", etc. The system must distinguish between these two types of signals and the incoming signals are tested (box 92) to determine if they are information signals 14 or control signals 16.

If the incoming signals are information signals 14 (which are usually voice analog signals) which are to be stored, then the information signals 14 are converted to digital form (box 94) and stored (box 96) in the information storage device 32.

If the incoming signals are control signals 16, the incoming control signals must be correlated with signals being transmitted by the system. The system is checked (box 98) to determine if the system is either transmitting or waiting for an incoming control signal. If the system is doing neither, then the incoming control signal is ignored (box 100). If the system is waiting for an incoming control signal, the incoming control signal is tested for validity (box 102) to determine if the control signal is a navigate command or a select command. The system only responds to incoming control signals *, # and 0. If the caller presses 1, 2, 3, etc. on their telephone, the system will ignore (box 100) the signal because it is not a valid signal.

If the incoming control signal is a valid signal, then it is checked (box 104) to determine if the system is to stop transmitting (a selection has been made) or is to continue transmitting. If the system is to stop transmitting, then the system stops transmitting (box 106) and proceeds to evaluate (box 108) the control signal to determine which type of control signal (navigate or select) has been received. If the system is to continue transmitting then the system proceeds (box 108).

As previously mentioned, there are three different incoming command signals. The * control signal (navigate command) moves the system back to the prior state from the state the system was in when the * button on the telephone was pressed. The # control signal (navigate command) moves the system forward to the next state from the state the system was in when the # button on the telephone was pressed. The 0 control signal (select command) selects the option or choice presently being presented when the 0 button on the telephone was pressed.

From box 108, system 10 will proceed to one of four different states. If the control signal is a * control signal, system 10 will deselect/delete the previous attribute values (box 110) which were chosen for the present state and retrieve (box 112) the prior state signal which is then stored and transmitted (box 114) to program control 30. For example, if the inventive system was being utilized in a buy/sell application of used cars with the system having at least six attributes including make, model, age, mileage, price and color and the caller was listening to the prices being transmitted to him and the caller decided that he wanted to return to the mileage attribute, the caller would depress the * button or pad on his telephone. This prior state signal would cause the program to deselect/delete particular price he had chosen (if he had chosen) and retrieve the prior state signals and return to the mileage attribute. If the caller could not make up his mind and did not choose (box 124) a mileage attribute, the system would automatically generate a prior state signal and the mileage attribute would be repeated (box 112).

If the control signal is a # control signal, system 10 would retrieve the next state signals (box 116) and would stop listing the attribute values for that particular attribute and would go to the next attribute or state. In the example of the previous paragraph, if the caller is listening to the list of prices and decides he does not care about the price, he would depress the # button or pad. This next state signal (box 116) would cause the program to jump to the next attribute, which is color.

If the control signal is a 0 control signal, system 10 would echo the selection (box 118) made by the caller so the caller will know if he had chosen the attribute value he desired and would then retrieve the next state signals (box 116) and go to transmit the next attribute and return to the ready state (box 120). In the example of the previous paragraph, if the caller is listening to the list of prices and hears $5000.00 and decides that is the price he wants to pay, then he would depress the 0 button or pad. The system would echo his selection by transmitting a message such as "You have selected the price of $5000.00" and then retrieve the next state signals (box 116) and go to the color attribute.

If during the process of evaluating the control signal (box 108), the system was disconnected from the caller or some sort of malfunction occurred, the system would generate an "end of dialogue signal" and would return to the ready state (box 120).

When the program has retrieved the next state signals (box 116) for the last attribute and the caller has heard the last attribute and corresponding attribute values and has made all his choices, then the system would generate an "end of dialogue signal" and would return to the ready state (box 120).

While in this state of "retrieve next state signals" (box 116), system 10 tests dynamic conditions (box 122) such as prior selection, time, counter, etc. In the test for relationships, system 10 would test the particular attribute value chosen at this time against the attribute values that had been previously chosen to determine if there is a fit. For example, system 10 would check to determine if the model of automobile chosen is a valid model for the make of automobile which was previously chosen.

In the test for time, the system could have a membership requirement in order for the caller to use the system and the check related to time would determine if the membership had expired.

In the test for counter, the system would allow a caller to use the system for only a predetermined length of time and not allow the caller to stay on the system all day and so the counter would maintain a count of the time the caller was using the system and after the designated length of time a message, such as "I'm sorry but your allotted time has expired and other callers would like to also use the system" and the system would disconnect the caller.

When in the state "retrieve next state signals", the tests for dynamic conditions (box 122) results in a "No" (the next state fails the tests) then the system returns to "retrieve next state signals" (box 116).

If at the time of retrieving the next state signals, the tests for dynamic conditions (box 122) results in a "Yes" (the next state passes the tests) then the system determines if a valid selection has been made (box 124). If a valid selection has been made, system 10 proceeds to store the valid selection and transmits a "retrieve next state signal" (box 126). If an invalid selection has been made, system 10 proceeds to retrieve prior state signals (box 112) and return to the previous attribute.

Figure 6:
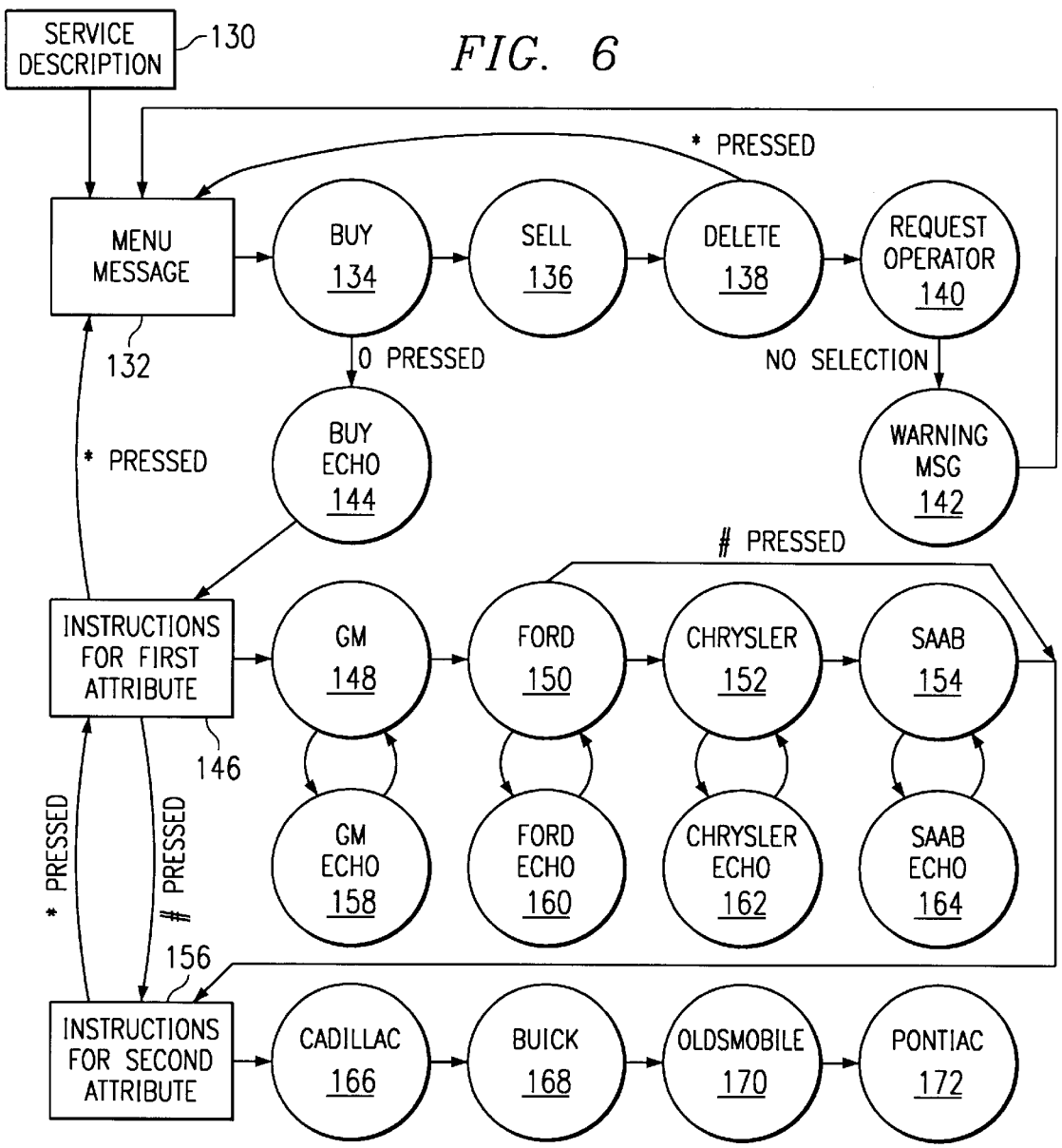
FIG. 6 shows a flowchart of a particular application of the present invention in the buy/sale of used automobiles.

The inventive method for accessing and controlling the selection of audiotext information may be understood in more detail from the flow chart shown in FIG. 6, which shows the first few dialogue levels of a Buy/Sell application involving the advertising of used cars for sale. The customer would access the service and hear the welcome and help messages as shown in steps 60 and 62 in FIG. 3. The customer would then hear a description in step 130 of the particular service, followed by a menu instruction message in step 132. Next, the types of service available are transmitted in the following steps: Buy (step 134), Sell (step 136), Delete Advertisement (step 138), and Request Operator (step 140). If the customer listens to the possible services without making a selection, a "No Selection" warning message is played in step 142 and the customer is returned to the menu instruction message of step 132. This loop is repeated until the customer makes a selection. A timer, or loop counter, may be employed to disconnect the phone line if the customer takes no action within a certain period.

If the customer misses selecting a particular menu item, say the "sell" item of step 136, and hears the delete option in step 138, pressing "*" will return the customer to the menu instruction message in step 132. Normally, the customer will press "0" to make a selection, say "buy" of step 134, while the system is transmitting the "buy" message of step 134. The system receives the control signal "0" via the DTMF signal. The system translates the "0" as user action "Select", which is then interpreted as "Selection" of step 134 and the system responds with an echo in step 144 of that selection. The user-system dialogue proceeds with the playing of the instructions in step 146 for the first attribute. If, during the transmission of the message in step 146, the customer realizes that an incorrect selection has been made, pressing the "*" will return the customer to the menu instruction message of step 132 and the previous "Buy" selection will be deselected.

The first attribute instruction message of step 146 is followed by the choice of makes available to the customer in the following steps: GM (step 148), Ford (step 150), Chrysler (step 152) and Saab (step 154). If the customer is interested in all makes, pressing "0" during the attribute instruction message of step 146, will select all makes and take the user down to the second attribute instruction in step 156, "Model".

However, the customer may be interested in particular makes of a car. Thus, the customer may hear GM in step 148 and select it by pressing "0" and hear an echo of GM in step 158 as confirmation. If a selection is not made, the system will proceed to play the next make, Ford in step 150, and so on. If Ford is selected, then an echo of Ford in step 160 is heard as confirmation. If Chrysler is selected, then an echo of Chrysler in step 162 is heard as confirmation. If Saab is selected, then an echo of Saab in step 164 is heard as confirmation.

One or more of the makes listed may be chosen. If, however, the customer has chosen the makes of interest, pressing "#" will terminate the "make selection" process and immediately move down to the second attribute instruction message in step 156, which is "Model". This message is followed by the list of models associated with the make selected above. If GM had not been selected in step 148, the messages in the following steps: Cadillac (step 166), Buick (Step 168), Oldsmobile (step 170) and Pontiac (step 172) would be skipped over without being played. If Ford had been selected in step 150, the various models of Ford would be played. If both GM and Ford had been chosen, then all models corresponding to GM and Ford would be played for selection. In a similar manner, other attributes of automobiles can be presented to the customer for selection. For example, price, age, mileage, color, and engine size can all be presented so that the final number of automobiles can be narrowed down to a small number that can be heard with ease. Note that, even though multiple selections may have been made (e.g. GM and Ford) only one pass of the attribute list is required to discriminate all attribute-values.

After each selection process the system will calculate how many automobiles are available and announce that number during the selection echo. If the customer selection choices result in either too few or too many automobiles available, the customer can move back to a previous attribute level by pressing the "*". The selection process can then be repeated to obtain a more favorable result (i.e. the search can be broadened).

It may be that a potential buyer wishes to find an automobile with a very specific set of attribute-values, and the system has none available. In this case, the "Buyer service" application can store the specific attribute-values together with the buyer's name and phone number. When an automobile matching the specific attribute-values is entered by a seller, the system automatically notifies the potential buyer.

The function of the sell application in step 136 is very similar to that of the buy application. The system transmits a series of attribute information and attribute-value messages to the user. The user presses a "0" key during the transmission of the attribute-value, which the system receives and translates into a "Select Attribute-value" event. For example, the attribute-value messages corresponding to "red, white, blue, green, grey, black", may be transmitted for the attribute "color". Thus the system is able to receive and store a list of attribute-values corresponding to the car the user is wishing to sell. Once the full list of attributes has been presented and selected, the system prompts the user to record a verbal description of the automobile for sale, and then the user's name and contact number. These recorded messages are stored and indexed by the system, to be retrieved later by sequentially referencing their attributes. The buy application makes use of such an arrangement.

Figure 7:
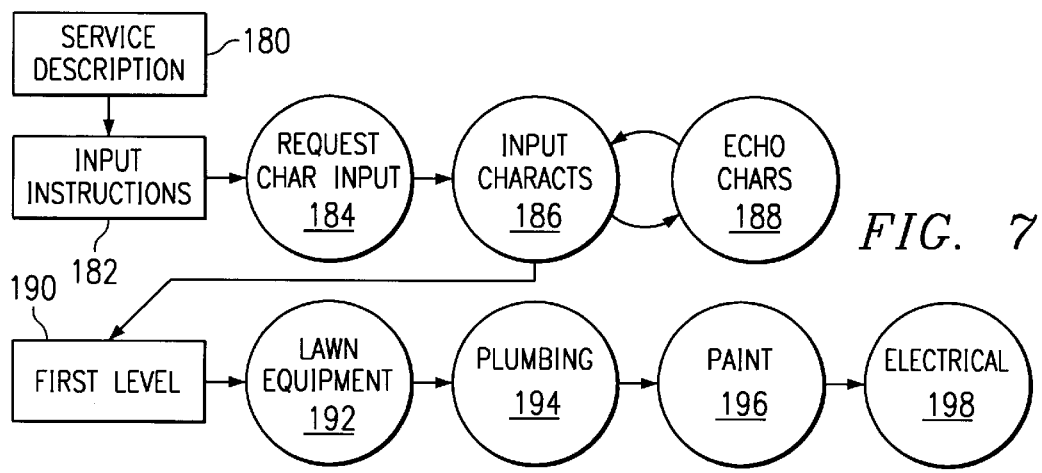
FIG. 7 shows a flowchart of a second type of application of the present invention for providing electronic "Yellow Pages".

A second type of application, the electronic Yellow Pages is illustrated in FIG. 7 In a manner similar to the previous application, once a customer has accessed the service, the service description is played in step 180. Next, the menu instruction is played in step 182, followed by a request in step 184 to input the first few characters, say five, of the Yellow Page item of interest. The customer can then enter the alpha characters in step 186 as previously described. The system echoes the input characters in step 188 for confirmation. When confirmed, the attributes of the item are presented for further customer discrimination. In this manner, the vendors that purvey the item can be narrowed down by the cumulative refinement of their attributes using attribute-values.

For example, if the subject for which the caller was requesting information was hardware, the caller would type in HARDW in step 186 as requested in step 184. The characters HARDW would be echoed in step 188 and the system would proceed to step 190 to the first level of attributes which could include lawn equipment (step 192), plumbing (step 194), paint (step 196), electrical (step 198), etc. If plumbing (step 194) was chosen then the attribute values under plumbing would be played for the caller and the caller could choose the desired attribute value, etc.

A further technique in the selection of information via their attribute-values is the facility of rearranging the order of attribute presentation to the user, to enable the user to choose the attribute that is most important to the user. For example, the user may view "price" as the most important attribute of a buyer service for automobiles, and is most interested in attribute-value pairs at the lower end of the price range. Thus, the user would wish to select price as the first attribute information message the system presents. The system feature that rearranges the presentation of attributes is called dynamic menuing, as distinct from the more common static menuing. In this case, the user is presented with a menu choice list, where each attribute message is transmitted in serial manner, similar to the service choice messages in steps 134, 136, 138, and 140 in FIG. 6. The user can request, by pressing the "0" key during the "price attribute" transmission, that the price attribute-values are transmitted next. The user selects one or more price ranges of interest and is returned to the attribute menu to select the next most important attribute. The attribute menu is then repeated, omitting the attribute first selected (price). The user repeats the attribute and attribute value selection until the number of items available has been narrowed down to an appropriate number.

The storage of items of information and the attribute-value pairs that define them, can be used to permit threshold or "fuzzy" matching retrieval. Clearly, when every attribute-value exactly matches the requirements of the user searching through the stored information, the completeness ratio of the match can be said to be perfect, or 100%. If, say, eight out of 10 attribute-values match, the completeness ratio can be said to be 80%. Obviously, in this case it becomes important to the user that the most important attributes match; the balance being unimportant or "Don't cares" from a logical decision standpoint. Therefore, the dynamic menu feature offers the user a method of obtaining the desired degree of completeness in the shortest possible time.

Matching may also be permitted over a limited range of attribute-values of a particular attribute. An attribute may have N attribute-values. If matching is permitted over X attribute-values, the matching is said to have an accuracy of (N−X)/(N−1). If, for example, N equals 21 and matching is permitted over a range of three attribute values, the matching accuracy is (21−3)/ (21−1) or 90%. A perfect match, over one range, gives an accuracy of (20−1)/(20−1) or 100%. In practice, the user would set up the fuzzy matching process on three steps:

1) Use dynamic menuing to set the order of the attributes,
2) Select the percentage of the completeness from the values calculated by the system and presented to the user as a series of messages and
3) Set the accuracy required for each attribute match, again from values calculated and presented by the system.

In this manner, a user can tailor the best fit matching to suite the application.

A general labeling strategy enables any terminal device with distinct signal generating keys to be used to enter alphanumeric characters and also control signals.

(1) Let A be an alphabet for a given language L, and
(2) let C be a character in that alphabet, and
(3) let d be a digit for the representation of numbers 0 though 9, for a total set N.
(4) Let y be the set of special control signals.

The control signals for typical applications are the set {modify, terminate, initiate, back, forward, select}. In this case y=6. Let z be the encoding factor of alphanumeric characters and special control signals per distinct signal generator on the terminal device. The total number of alphanumeric characters is X, where X includes A and N.

The terminal device must support X/z+y distinct signal generators. Alternatively, if g is the number of distinct signal generators, then the rounded up values of [X/g], [y/g] is the minimal encoding per key.

For the English language: L=English, A=A through Z, N=0 through 9, X=36. The telephone handset has a maximum encoding factor of 4, and 12 distinct signal generators. Thus, the number of alphanumeric generators required is 36/4 or nine keys, and the "star", "pound", and "flash" controls 3/4 or one signal on each of the remaining keys. Since, in the case of the telephone, an incomplete character set is used, the 12 keys are more than adequate.

The remote control of a television set can also be used to input characters using the same character labeling scheme.

In short, this invention describes a new method for arriving at the selection of a small number of stored multi-media pieces of information from a mass of stored items, by the successive selection of their particular attribute-values.

We claim:

1. A method of human-computer interaction, comprising the steps of:
    a) in response to a signal received by a processor, said processor transmitting, in an interactive, non-predetermined manner, an information message to a multi-media terminal;
    b) in response to said information message having been received, in an interactive, non-predetermined manner, at said multi-media terminal, said multi-media terminal presenting said information message to a human user;
    c) in response to being presented with said information message, said human user interpreting semantic content of said information message and transmitting, in an interactive, non-predetermined manner, via said multi-media terminal, a dynamic, time-based control signal to said processor;
    d) in response to said processor receiving said dynamic, time-based control signal transmitted by said human user, said processor assigning meaning based on said information message to said dynamic, time-based control signal via a method of interpretation, further comprising the steps of:
        d.1) correlating, in a dynamic, time-based manner, the receipt of said dynamic, time-based control signal with the transmission of said information message by said processor and the presentation of said information message to said human user; and
        d.2) interpreting, in real time, the said dynamic, time-based correlation as a control command selected from the group consisting of:
            d.2.i) a means for indicating to said processor a selection of the semantic meaning conveyed by said information message; and
            d.2.ii) a means for causing said processor to move to a new processor state;
    e) in response to said processor making said correlation, in a dynamic, time-based manner, and said interpretation, in real time, said processor transmitting individual echo information messages in real time to said multi-media terminal;
    f) in response to said individual echo information messages having been received at said multi-media terminal, said multi-media terminal presenting said individual echo information messages to said human user; and
    g) in response to being presented with said individual echo information messages, said human user interpreting said individual echo information messages as a means for confirming said interpretation by said processor of said dynamic, time-based control signal,
    whereby said method of human-computer interaction enables said human user to dynamically store and retrieve a multiplicity of information forms using attributes and attribute-values.

2. The method of claim 1 wherein said step of said processor transmitting an information message to said multi-media terminal employs a transmission means whereby said information message comprises a multiplicity of forms of media selected from the group of audio, video, animation, alphanumeric text, binary numeric data and a multiplicity of encoded control signals for tactile stimulations.

3. The method of claim 1 wherein said step of said multi-media terminal presenting said information message to said human user employs a presentation means whereby said information message has been selected from the group of audio sounds, video imagery, animation sequences, and a multiplicity of tactile stimulations, whereby said presentation means permits human-computer interaction utilizing concurrent dynamic forms of information and selection.

4. The method of claim 1 wherein said step of said human user transmitting via said multi-media terminal a dynamic, time based control signal to said processor utilizes dynamic, time-based control signaling means whereby said dynamic, time-based control signal has been designated to be selected from the group consisting of:
    a) signal transmission means to transmit a discrete control signal to said processor; and
    b) controlling information message transmission means to transmit a control information message to said processor, enabling said processor to interpret the receipt of said control information message as said dynamic, time-based control signal.

5. The method of claim 1 wherein said step of said processor correlating the receipt of said dynamic, time-based control signal with the transmission of said information message by said processor and the presentation of said information message to said human user includes the step of:
- a) establishing temporally that said dynamic, time-based control signal was received by said processor when an event selected from the group consisting of:
  - a1) said transmission of said information message by said processor; and
  - a2) said presentation of said information message to said human user, occurred at the same time.

6. The method of claim 1 wherein said step of said processor interpreting, in real time, the said dynamic, time-based correlation as a control command and a means for indicating to said processor a selection of said information message includes control evaluation means for recognizing said control command as a selection command so designated by said processor.

7. The method of claim 1 wherein said step of said processor interpreting, in real time, the said dynamic, time-based correlation as a control command and a means for causing said processor to move to a new processor state includes control evaluation means for recognizing said dynamic, time-based control signal as a navigation command selected from the group consisting of:
- a) prior state control signal, wherein said processor has backward navigation means, enabling said processor to move to a prior state; and
- b) next state control signal, wherein said processor has forward navigation means, enabling said processor to move to a next state.

\* \* \* \* \*